US009218000B2

(12) United States Patent
McLaughlin et al.

(10) Patent No.: US 9,218,000 B2
(45) Date of Patent: Dec. 22, 2015

(54) SYSTEM AND METHOD FOR CLOUD COMPUTING

(75) Inventors: Paul F. McLaughlin, Ambler, PA (US); Matthew G. Burd, Calgary (CA)

(73) Assignee: Honeywell International Inc., Morristown, NJ (US)

(*) Notice: Subject to any disclaimer, the term of this patent is extended or adjusted under 35 U.S.C. 154(b) by 1181 days.

(21) Appl. No.: 12/416,830

(22) Filed: Apr. 1, 2009

(65) Prior Publication Data
US 2010/0257227 A1 Oct. 7, 2010

(51) Int. Cl.
*G06F 15/173* (2006.01)
*G05B 23/02* (2006.01)
*G06F 17/30* (2006.01)
*H04L 29/08* (2006.01)

(52) U.S. Cl.
CPC ...... *G05B 23/0264* (2013.01); *G06F 17/30575* (2013.01); *H04L 67/10* (2013.01); *H04L 67/1095* (2013.01)

(58) Field of Classification Search
USPC .................................................. 709/203, 226
See application file for complete search history.

(56) References Cited

U.S. PATENT DOCUMENTS

| | | | |
|---|---|---|---|
| 5,657,390 A | 8/1997 | Elgamal et al. | |
| 6,480,896 B1 | 11/2002 | Brown et al. | |
| 6,816,973 B1 | 11/2004 | Gleichauf et al. | |
| 7,130,891 B2 | 10/2006 | Bernardin et al. | |
| 7,151,966 B1 | 12/2006 | Baier et al. | |
| 7,206,286 B2 | 4/2007 | Abraham et al. | |
| 7,233,830 B1 | 6/2007 | Callaghan et al. | |
| 7,266,417 B2 | 9/2007 | Liao | |
| 7,286,897 B2 | 10/2007 | Liu et al. | |
| 7,313,447 B2 | 12/2007 | Hsiung et al. | |
| 7,343,152 B1* | 3/2008 | Khorram | 455/414.1 |
| 7,461,403 B1 | 12/2008 | Libenzi et al. | |
| 7,548,977 B2 | 6/2009 | Agapi et al. | |
| 7,584,274 B2 | 9/2009 | Bond et al. | |
| 7,620,986 B1 | 11/2009 | Jagannathan et al. | |
| 7,636,764 B1 | 12/2009 | Fein et al. | |

(Continued)

FOREIGN PATENT DOCUMENTS

| | | |
|---|---|---|
| DE | 102004030781 A1 | 3/2006 |
| WO | WO 2005/020179 A1 | 3/2005 |
| WO | WO 2009/046095 A1 | 4/2009 |

OTHER PUBLICATIONS

Aaron Skonnard, "Why Service Virtualization Matters", Microsoft Services, 4 pages.

(Continued)

*Primary Examiner* — Vivek Srivastava
*Assistant Examiner* — Nicholas Celani

(57) ABSTRACT

A system includes a computing cloud having at least one data storage unit and at least one processing unit. The computing cloud is configured to receive information associated with at least one process collected by an industrial tool, archive the process-related information, analyze the process-related information, and instruct a client device on a type of data to be cached by the client device. §The industrial tool could include a sensor configured to collect data associated with industrial equipment. Also, the client device may be associated with a local environment, the sensor may be configured to capture sensor readings at a specified interval, and the local environment may be configured to use a subset of the sensor readings. The client device can be configured to provide all of the sensor readings to the computing cloud.

21 Claims, 6 Drawing Sheets

(56) References Cited

U.S. PATENT DOCUMENTS

| | | | |
|---|---|---|---|
| 7,684,876 | B2 | 3/2010 | Grgic |
| 7,693,581 | B2 | 4/2010 | Callaghan et al. |
| 7,799,273 | B2 | 9/2010 | Popp |
| 7,870,106 | B1* | 1/2011 | Nguyen et al. ............... 707/694 |
| 7,873,719 | B2 | 1/2011 | Bishop et al. |
| 2002/0078382 | A1* | 6/2002 | Sheikh et al. ............... 713/201 |
| 2003/0014498 | A1 | 1/2003 | Kreidler et al. |
| 2003/0061212 | A1 | 3/2003 | Smith et al. |
| 2003/0120778 | A1 | 6/2003 | Chaboud et al. |
| 2003/0182359 | A1* | 9/2003 | Vorchik et al. ............... 709/203 |
| 2004/0002943 | A1 | 1/2004 | Merrill et al. |
| 2004/0128539 | A1 | 7/2004 | Shureih |
| 2004/0260769 | A1 | 12/2004 | Yamamoto |
| 2005/0021594 | A1* | 1/2005 | Bernardin et al. ............ 709/200 |
| 2005/0021705 | A1 | 1/2005 | Jurisch |
| 2005/0276228 | A1 | 12/2005 | Yavatkar et al. |
| 2005/0278441 | A1 | 12/2005 | Bond et al. |
| 2006/0004786 | A1 | 1/2006 | Chen et al. |
| 2006/0059163 | A1 | 3/2006 | Frattura et al. |
| 2006/0085393 | A1* | 4/2006 | Modesitt ......................... 707/3 |
| 2006/0155633 | A1 | 7/2006 | Fellenstein et al. |
| 2006/0184626 | A1* | 8/2006 | Agapi et al. .................. 709/205 |
| 2006/0230149 | A1 | 10/2006 | Jackson |
| 2007/0055702 | A1 | 3/2007 | Fridella et al. |
| 2007/0074288 | A1 | 3/2007 | Chang et al. |
| 2008/0120414 | A1 | 5/2008 | Kushalnagar et al. |
| 2008/0159289 | A1 | 7/2008 | Narayanan et al. |
| 2008/0208361 | A1* | 8/2008 | Grgic ............................... 700/2 |
| 2008/0270523 | A1 | 10/2008 | Parmar et al. |
| 2009/0058088 | A1* | 3/2009 | Pitchford et al. ............... 290/50 |
| 2009/0125370 | A1 | 5/2009 | Blondeau et al. |
| 2009/0132070 | A1* | 5/2009 | Ebrom et al. ................... 700/90 |
| 2009/0172035 | A1* | 7/2009 | Lessing et al. ............. 707/104.1 |
| 2009/0210071 | A1 | 8/2009 | Agrusa et al. |
| 2009/0271012 | A1* | 10/2009 | Kopka et al. ..................... 700/83 |
| 2009/0300151 | A1 | 12/2009 | Friedman et al. |
| 2009/0300210 | A1 | 12/2009 | Ferris |
| 2009/0300635 | A1 | 12/2009 | Ferris |
| 2010/0022231 | A1 | 1/2010 | Heins et al. |
| 2010/0023151 | A1 | 1/2010 | Shieh et al. |
| 2010/0042720 | A1 | 2/2010 | Stienhans et al. |
| 2010/0256794 | A1 | 10/2010 | McLaughlin et al. |
| 2010/0256795 | A1 | 10/2010 | McLaughlin et al. |
| 2010/0257228 | A1 | 10/2010 | Staggs et al. |
| 2010/0257605 | A1 | 10/2010 | McLaughlin et al. |

OTHER PUBLICATIONS

Kevin P. Staggs, et al., "Cloud Computing for an Industrial Automation and Manufacturing System", U.S. Appl. No. 12/416,859, filed Apr. 1, 2009.

Paul F. McLaughlin, et al., "Cloud Computing for a Manufacturing Execution System", U.S. Appl. No. 12/416,790, filed Apr. 1, 2009.

Paul F. McLaughlin, et al., "Cloud Computing as a Basis for Equipment Health Monitoring Service", U.S. Appl. No. 12/416,848, filed Apr. 1, 2009.

Notification of Transmittal of the International Search Report and the Written Opinion of the International Searching Authority, or the Declaration dated Oct. 29, 2010 in connection with International Patent Application No. PCT/US2010/028218.

Notification of Transmittal of the International Search Report and the Written Opinion of the International Searching Authority, or the Declaration dated Oct. 29, 2010 in connection with International Patent Application No. PCT/US2010/028210.

Notification of Transmittal of the International Search Report and the Written Opinion of the International Searching Authority, or the Declaration dated Oct. 29, 2010 in connection with International Patent Application No. PCT/US2010/028208.

"Real-Time Data Hosting . . .", www.industrialevolution.com/ms_services_host.html, May 27, 2009, 1 page.

Zheng Wang, et al., "Prefetching in World Wide Web", IEEE Global Telecommunications Conference, Nov. 1996, p. 28-32.

Supplementary European Search Report dated Nov. 19, 2012 in connection with European Patent Application No. EP 10 76 4813.

Communication pursuant to Artile 94(3) EPC dated Mar. 15, 2013 in connection with European Patent Application No. 10 764 816.4.

Supplementary European Search Report dated Mar. 4, 2013 in connection with European Patent Application No. EP 10 76 4816.

* cited by examiner

SYSTEM AND METHOD FOR CLOUD COMPUTING

TECHNICAL FIELD

This disclosure relates generally to computer systems and, more specifically, to the use of cloud computing in process historian applications, and systems and methods related to the use of cloud computing in process historian applications.

BACKGROUND

Cloud computing is an emerging technology in the information technology (IT) industry. Cloud computing allows for the moving of applications, services and data from desktop computers back to a main server farm. The server farm may be off premises and be implemented as a service. By relocating the execution of applications, deployment of services, and storage of data, cloud computing offers a systematic way to manage costs of open systems, centralize information, and enhance robustness and reduce energy costs.

SUMMARY

This disclosure provides a system and method for using cloud computing in process historian applications.

In a first embodiment, a system includes a computing cloud comprising at least one data storage unit and at least one processing unit. The computing cloud is configured to receive information relating to at least one process by an industrial tool, archive the process-related information, provide analysis of the process-related information, and instruct a client device on the type of data to be cached by the device.

In particular embodiments, the industrial tool comprises at least one sensor configured to collect data.

In other particular embodiments, the system provides information relating to the client device on demand to the client device. In still other particular embodiments, the system allows for the client device to connect to the system through a Service Oriented Architecture. In further embodiments, the client device is configured to connect to the system through a local bus connection. In yet further embodiments, the client device is configured to transmit some or all data from the industrial tool to the system.

In a second embodiment, a method includes obtaining data related to at least one process tool from a client. The at least one process tool includes at least one sensor used to collect the data. The method further includes storing the data related to the at least one process tool in a computing cloud and providing access to the data related to the at least one process tool through a secure connection.

In a third embodiment, an apparatus includes at least one data storage unit in a computing cloud. The at least one data storage unit is configured to store information related to at least one industrial tool. The apparatus also includes least one processing unit configured to control connections between the computing cloud and at least one client, record information from the at least one client, and provide physical proximity performance to the at least one client when accessing information from the at least one client.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which.

DETAILED DESCRIPTION

FIGS. 1 through 6, discussed below, and the various embodiments used to describe the principles of the present invention in this patent document are by way of illustration only and should not be construed in any way to limit the scope of the invention. Those skilled in the art will understand that the principles of the invention may be implemented in any type of suitably arranged device or system.

Figure 1:
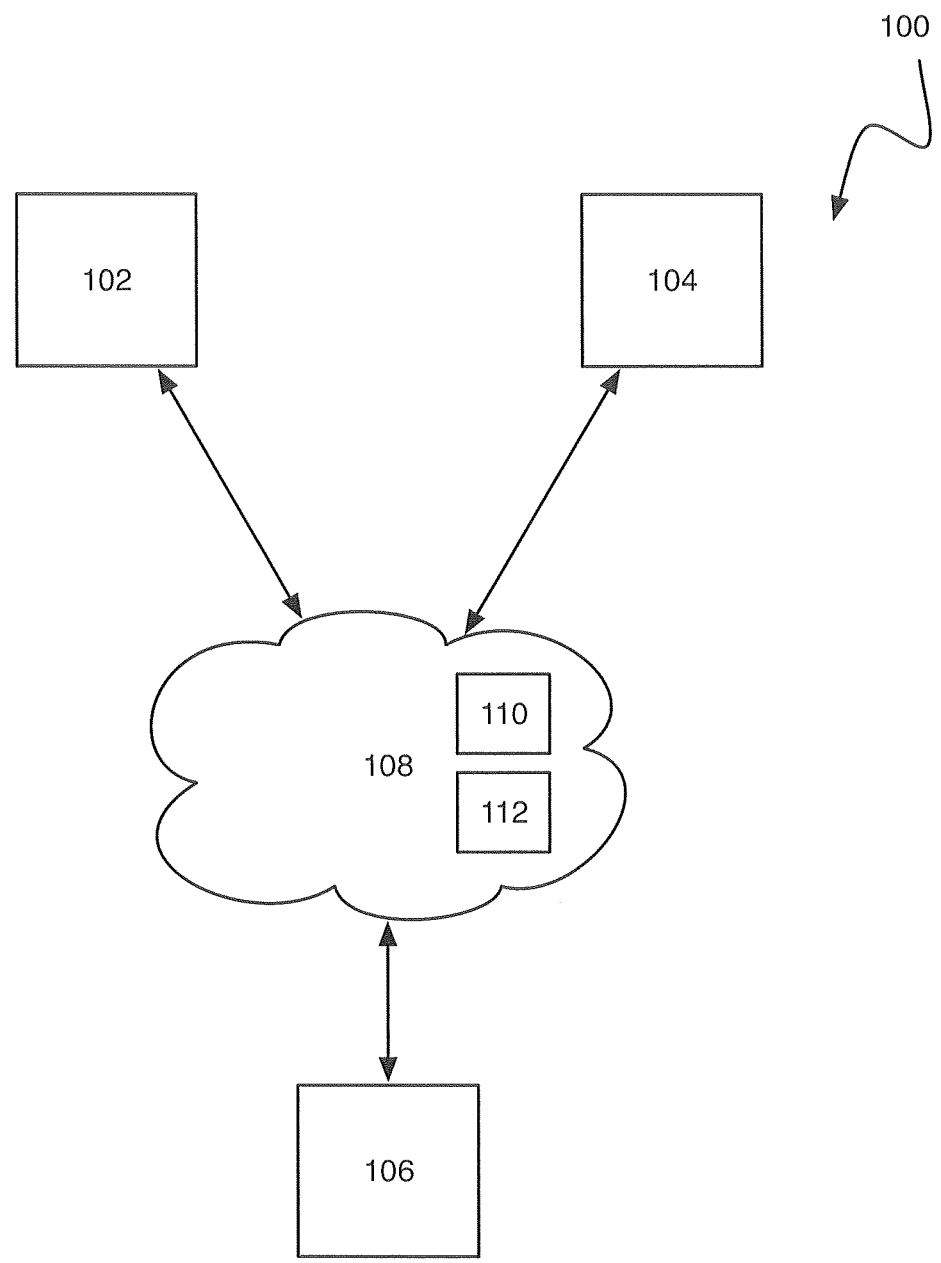
FIG. 1 illustrates an example cloud computing environment according to this disclosure.

FIG. 1 illustrates an example system 100 according to this disclosure. FIG. 1 shows clients 102, 104, and 106 connected to a computing cloud 108. Computing cloud 108 comprises processing unit 110 and data storage unit 112, both of which are accessible to clients 102, 104, and 106. One of the innovative aspects of this disclosure is the ability to design a flexible, robust cloud 108 that can service a variety of deployment environments through an innovative hybrid approach. This hybrid approach recognizes both the type of information needed as well as the location of where that information needs to be. For instance in a historian system used in an automated factory setting, the system must recognize both the types of information needed to be processed as well as which information needs to be stored locally and which information may be stored in a computing cloud.

Computing cloud 108 is a computing cloud that is capable of both storing information and performing data functions on information. A computing cloud comprises at least one computer that is accessible from a remote location. The computing cloud 108 may comprise a plurality of storage devices that will be referred to as collectively the storage unit 112, as well as a plurality of processing units that will be referred to collectively as the processing unit 110. The computing cloud 108 may comprise hardware that is cost prohibitive to deploy and maintain at individual clients 102, 104, and 106. In addition, the computing cloud 108 may comprise software that is cost prohibitive to install, deploy, and maintain at individual computing clouds. Therefore, the computing cloud 108 may provide this hardware and software through secure connections to clients 102, 104, and 106. While there is one computing cloud 108 shown in FIG. 1, it is explicitly understood that a plurality of clouds may be consistent with this disclosure. It is understood that the disclosed historian system can collect, store, and retrieve data for multiple clients, multiple systems within a single client, as well as multiple systems located within multiple clients.

Clients 102, 104, and 106 are individual computers, plant sites, or operational locations that are in communication with the computing cloud 108. Clients 102, 104, and 106 are capable of accessing both the processing unit 110 and storage unit 112 that are located in the computing cloud 108. Clients 102, 104, and 106 are able to access both local processes as well as information from the computing cloud 108. Clients 102, 104, and 106 may comprise a plurality of manufacturing tools and sensors to monitor the manufacturing tools. These sensors may detect any operational condition of the manufacturing tools, including, but not limited to, the temperature, vibration, or other measureable operating parameter.

Clients 102, 104, and 106 communicate with the computing cloud 108 through any secured or unsecured method, including Hypertext Transfer Protocol Secure (HTTPS), secure telnet, or file transfer protocol secure (FTPS). It is understood that secure methods may be preferred over unsecure methods, and that the particular method chosen will depend upon the requirements of the function being accessed. This disclosure should not be interpreted as being limited to any particular protocol or method of transferring data.

In some embodiments, the computing cloud 108 may leverage a Service Oriented Architecture (SOA) to abstract consumers of cloud services from the location services themselves. When a cloud user at a given client invokes a function, such as aggregating historical data, that function could be performed by historian components local to the same client or redirected to historian components running on a server in the computing cloud 108. This redirection is performed by a service bus that exposes a set of service endpoints to users who interact with these services as if the services were local. The service bus directs requests for those services to the appropriate service providers either locally or in the cloud based on configured mapping. Mapping can be done on a per service basis, allowing a mix of local and cloud-based services to be used. The service bus itself could be local to the plant or also located in the cloud. The disclosed systems and methods can be designed for multi-tenancy, such that many companies can share the same physical database resources but keep their respective data entirely private.

One of the innovative features of this disclosure is the use of a hybrid approach when distributing data storage and data processing among a plurality of clouds in use by a historian system. Some features of the clients 102, 104, and 106 can be better performed by the computing cloud 108 than at the client 102, 104, and 106. By determining which functions can be performed more efficiently in the computing cloud 108 than at the local client 102, 104, and 106, computing resources can be allocated in such a way as to maximize performance. It is understood that this hybrid approach allows a plurality of applications including, but not limited to, applications that promote operator advanced functions (alarm analysis and reconfiguration), batch execution, simulation, or other applications to efficiently access the data stored by the historian system.

Figure 2:
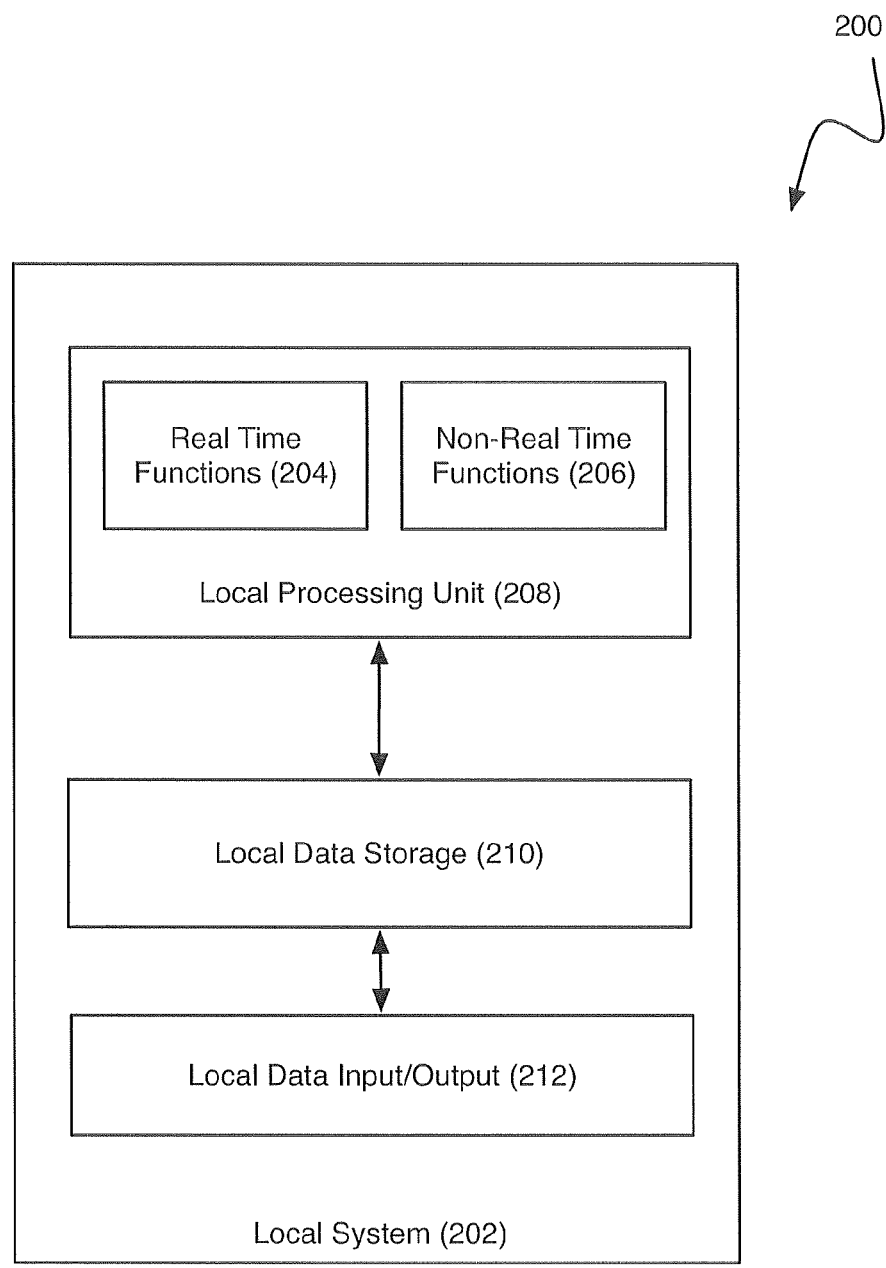
FIG. 2 illustrates an example local system environment according to this disclosure.

FIG. 2 is an illustration 200 of a local system 202. Each client 102, 104, and 106 comprises a local system 202. The local system 202 comprises a local processing unit 208, a local data storage 210, and a local data input/output 212. The local processing unit 208 may comprise both real time functions 204 and non-real-time functions 206.

Real time functions are those functions that instruct or control other devices, including the actual mechanical systems used in a factory, or provide data to personnel who are operating those mechanical systems. These real time functions are generally always required to be available, and may be designed to be non-resource intensive. An example of these real time functions may include the programming of a basic automated system to perform a specific function (e.g., drill into a substance) for a specific time. The phrase "real time" is intended to refer the requirement that the data created by a real time function be available upon demand from the actual mechanical systems or personnel who are operating the mechanical systems.

Non-real time functions are functions that may be used to form the real-time functions. Examples of non-real-time functions are those functions used to train the real time functions and simulations of the products created by the non-real-time functions. These non-real-time functions are may be processor intensive and require specialized software.

Not only may functions be performed on a real time or non-real time basis, data may be required by the system on a real or non-real time basis. In one embodiment, data that is required on a real time basis will be stored locally in local data storage 210 while data that is not needed on a real time basis may be stored in the storage unit 112 in the computing cloud 108.

The delineation between real time and non-real time is intended to be an exemplary method of determining which processes and data should be stored locally and which processes and data should be stored in the computing cloud 108. It is expressly understood that other delineations may be used, based on priority or other characteristics of the data. Any system or method that delineates shared processes and storage, and then executes the system and method using a hybrid approach on both a computing cloud 108 and a local system 202 is explicitly contemplated by this disclosure.

Another advantage of the presently disclosed systems and methods is the ability to rapidly deploy new services or features to a plurality of clients without the need to make changes to the clients themselves. As a new service becomes available (e.g., an advanced analysis tool becomes available), this service may be offered to improve the manufacturing process at a given site without the need for reprogramming at the site.

Yet another advantage of the presently disclosed systems and methods is the use of a partition model within the computing cloud 108. The partition model allows the cloud to determine what data should be stored by the local system 202, the computing cloud 108, and both the local system 202 and the computing cloud 108. In addition, by awareness of the location of the data within the partition mode, data reliability and consistency can be maintained.

Figure 3:
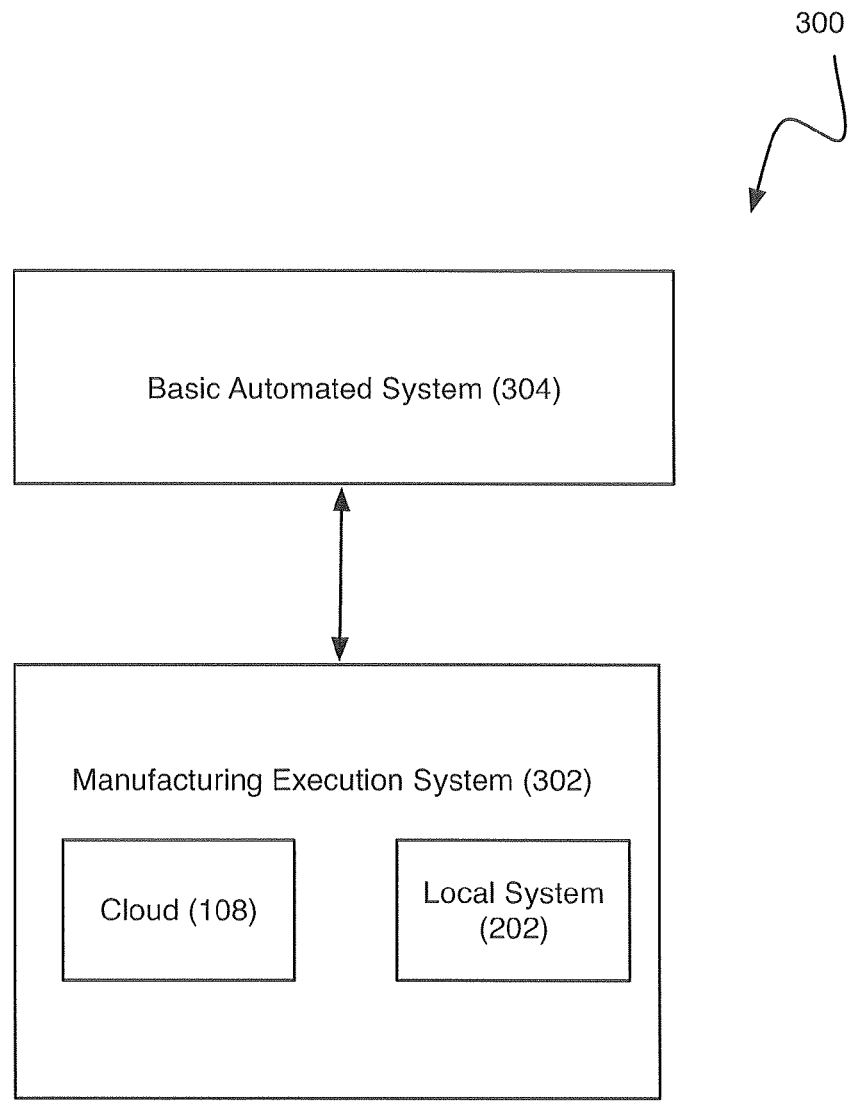
FIG. 3 illustrates an example historian system according to this disclosure.

FIG. 3 is an example embodiment 300 of one system using a historian system 302. In this example embodiment, the historian system 302 comprises both the computing cloud 108 and the local system 202. It is understood that the historian system 302 may comprise a plurality of local systems and a plurality of computing clouds. It is understood that the historian system 302 may be used with any automation system and with any type of client.

Figure 4:
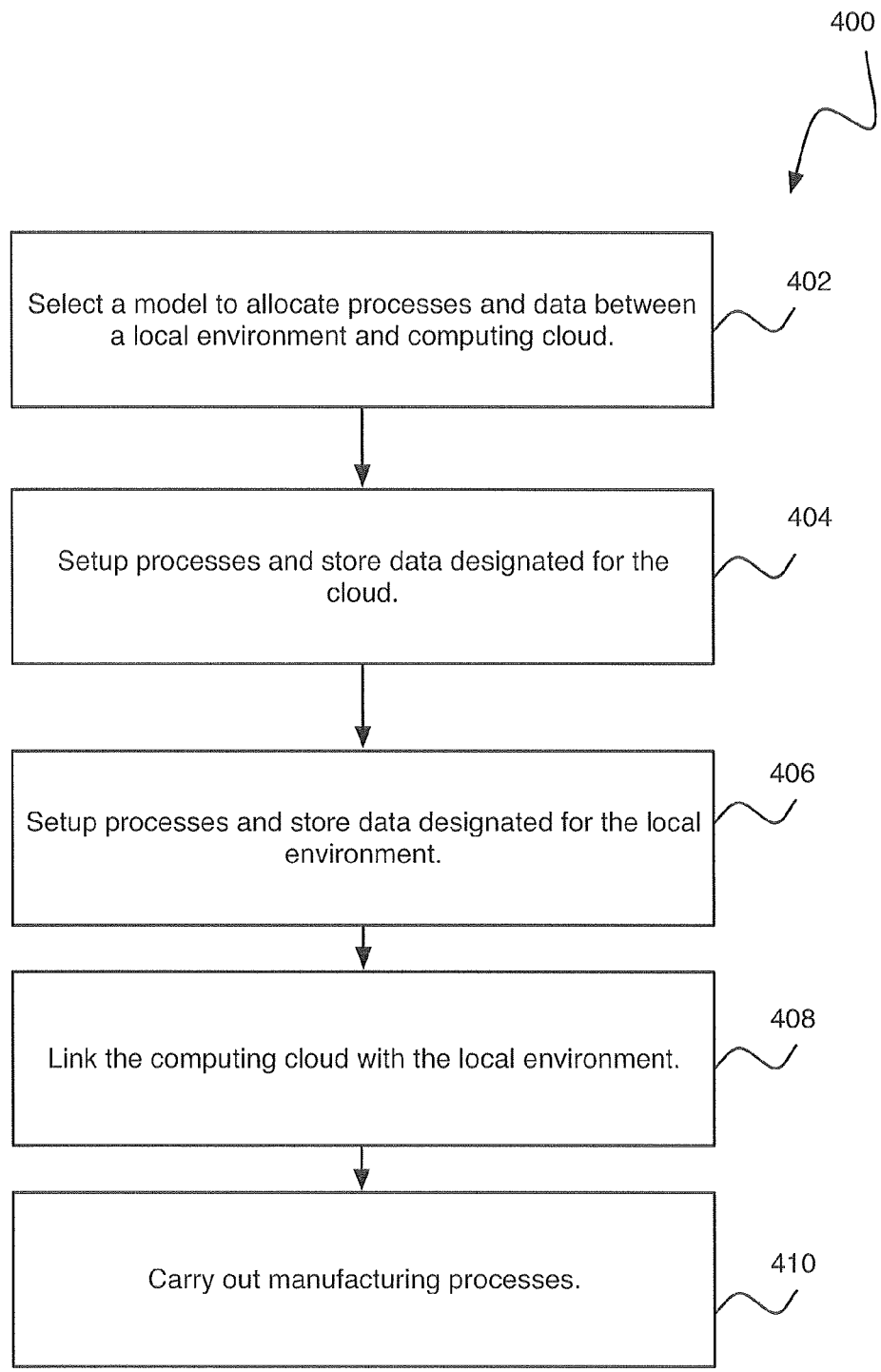
FIG. 4 illustrates an example method of allocating processes and data according to this disclosure.

FIG. 4 is an example of one method 400 of executing the presently disclosed hybrid approach. In this embodiment, a model is selected to allocate processes and data between the local environment 202 and the computing cloud 108 in block 402. In block 404, the processes for the cloud are setup, and data is stored in the cloud. In block 406, the processes for the local environment are setup, and data is stored in the local environment. In block 408, the computing cloud 108 is linked to the local environment 202. In block 410, the manufacturing processes are carried out.

Yet another benefit of the present hybrid approach is the ability to create a process historian capable of capturing, providing, and archiving process related data for process operations and analysis. This analysis may include providing the client with a visualization of the process history. This visualization may include trend displays, alarm and event summaries, and archives of the process history.

Personnel who are operating a process in a plant need timely access to recent history, such as the past 24 hours This data is considered critical for plant operations and so can be hosted in a local system. Personnel who are involved with troubleshooting and improvement of plant operations often require access to much greater amounts of data, such as the past year. Personnel who are responsible for demonstrating compliance with environmental and other regulations often require data to be stored for very long periods of time, such as ten years. These latter two cases require extensive and ever increasing storage and are well suited to storing in the cloud.

Another benefit of the cloud approach is that data from multiple local systems and potentially from multiple companies is stored in a single location where it can be used for analysis such as performance benchmarking.

In one embodiment, local collectors and other devices would aggregate data in one or more systems, and these systems can be in the same or diverse geographic areas. Cloud services would then collect, analyze, and inform based on this data.

Figure 5:
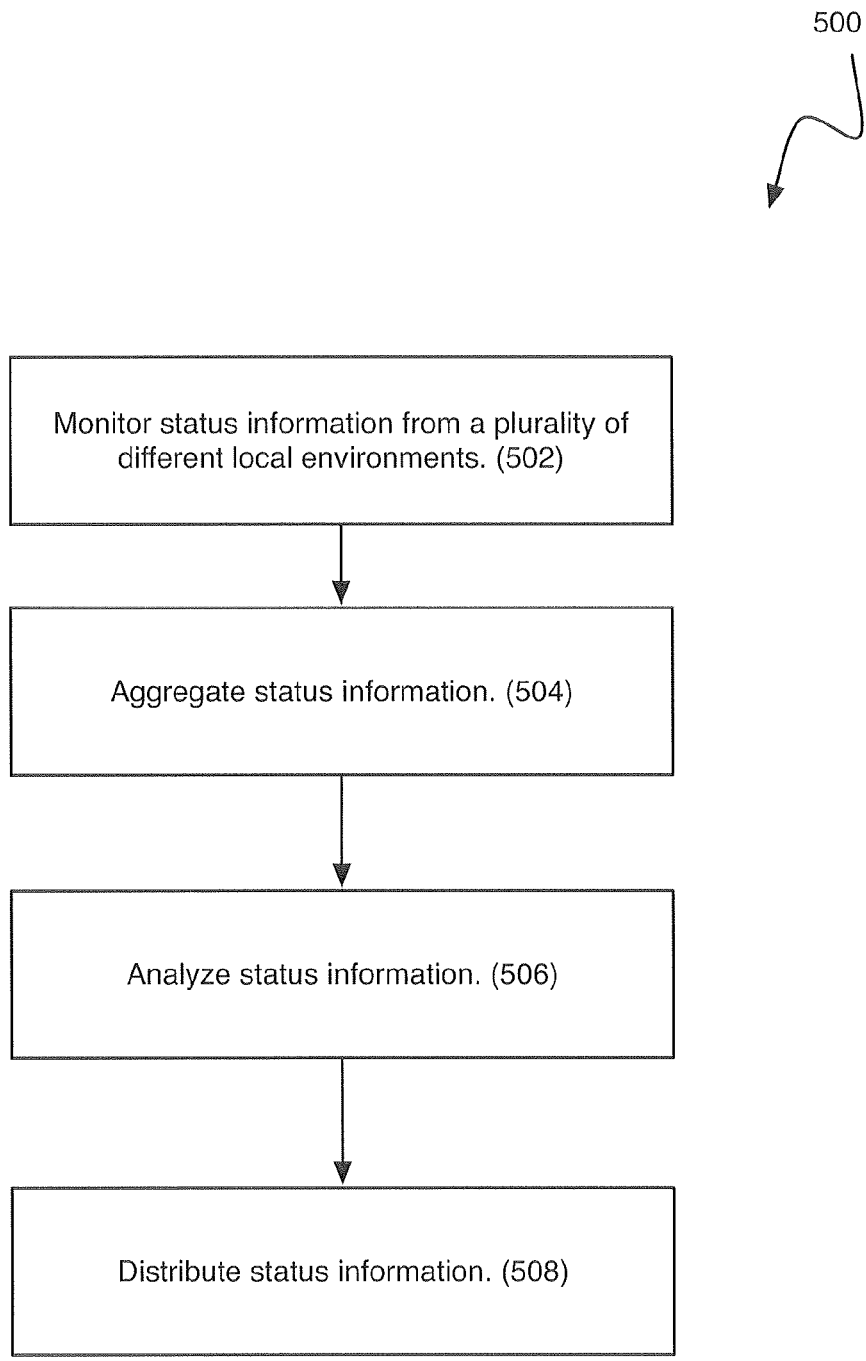
FIG. 5 illustrates an example method of monitoring status information according to this disclosure.

FIG. 5 is a flowchart 500 illustrating one method of collecting information using computing cloud 108. In block 502, the status information is monitored from a plurality from different local environment. In block 504, the status information is aggregated from each of the local environments. In block 506, the status information is analyzed. In block 508, status information is distributed.

The information that will be stored in the local environment 202 and the computing cloud 108 as opposed to that which is stored only in the computing cloud 108 may be determined based upon what information is anticipated to be needed by the local environment 202. For instance, the local environment may take readings every 10 seconds but only require readings every minute. Each of the readings may be stored in the computing cloud 108 for enhanced analysis, but only one reading a minute will be stored in the local environment 202. This storage will allow the local environment 202 to cache the data that it anticipates needing while providing the computing cloud 108 with all available data. In this way, the computing cloud 108 has as much information as possible to perform analysis while the local environment has stored the information it needs for immediate operation. This allows the local environment 202 to achieve physical proximity performance with the data stored in the computing cloud 108. Here, the phrase "physical proximity performance" refers to a level of performance, as measured by metrics known to one skilled in the art (including the network bandwidth and network lag) where the performance of the computing cloud 108 is approximate to the performance provided by a system that is comparable to computing cloud 108 and located within the local environment 202. In addition, in some embodiments, based upon the analysis preformed by the computer cloud 108, the computing cloud 108 may determine what information is necessary for the local environment 202 and instruct the local environment 202 as to what data should be cached locally.

Figure 6:
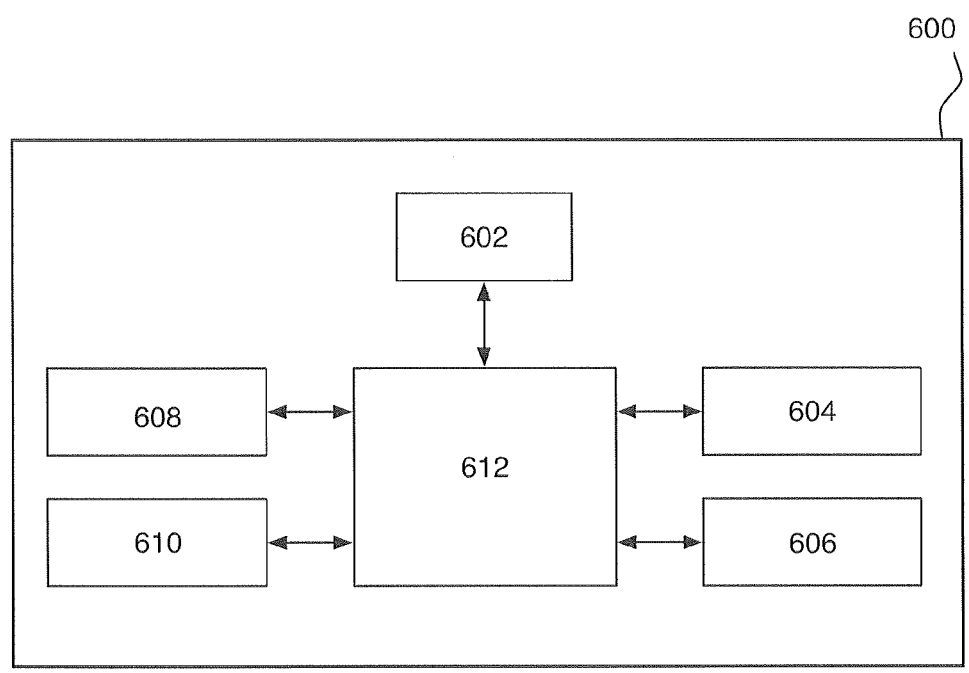
FIG. 6 illustrates an example computer system supporting cloud computing according to this disclosure.

Computing cloud 108 and elements of the local environment 202 described above may be implemented on any general-purpose computer 600 with sufficient processing power, memory resources, and network throughput capability to handle the necessary workload placed upon it. A consumer home personal computer, networked to computing cloud 108 through a wide area network, such as the Internet, may be used in conjunction with the disclosed embodiments. The consumer home personal computer may share some, or all, of the elements of computing cloud 108. FIG. 6 illustrates a typical, computer system suitable for implementing one or more embodiments disclosed herein. The general-purpose computer 600 includes a processor 612 (which may be referred to as a central processor unit or CPU) that is in communication with memory devices including secondary storage 602, read only memory (ROM) 604, random access memory (RAM) 606, input/output (I/O) 608 devices, and network connectivity devices 610. The processor may be implemented as one or more CPU chips.

The secondary storage 602 is typically comprised of one or more disk drives or tape drives and is used for non-volatile storage of data and as an over-flow data storage device if RAM 606 is not large enough to hold all working data. Secondary storage 602 may be used to store programs that are loaded into RAM 606 when such programs are selected for execution. The ROM 604 is used to store instructions and perhaps data that are read during program execution. ROM 604 is a non-volatile memory device that typically has a small memory capacity relative to the larger memory capacity of secondary storage. The RAM 606 is used to store volatile data and perhaps to store instructions. Access to both ROM 604 and RAM 606 is typically faster than to secondary storage 602.

I/O 608 devices may include printers, video monitors, liquid crystal displays (LCDs), touch screen displays, keyboards, keypads, switches, dials, mice, track balls, voice recognizers, card readers, paper tape readers, or other well-known input devices. The network connectivity devices 362 may take the form of modems, modem banks, ethernet cards, universal serial bus (USB) interface cards, serial interfaces, token ring cards, fiber distributed data interface (FDDI) cards, wireless local area network (WLAN) cards, radio transceiver cards such as code division multiple access (CDMA) and/or global system for mobile communications (GSM) radio transceiver cards, and other well-known network devices. These network connectivity devices 610 may enable the processor 612 to communicate with an Internet or one or more intranets. With such a network connection, it is contemplated that the processor 612 might receive information from the network, or might output information to the network in the course of performing the above-described method steps. Such information, which is often represented as a sequence of instructions to be executed using processor 612, may be received from and outputted to the network, for example, in the form of a computer data signal embodied in a carrier wave.

Such information, which may include data or instructions to be executed using processor 612 for example, may be received from and outputted to the network, for example, in the form of a computer data baseband signal or signal embodied in a carrier wave. The baseband signal or signal embodied in the carrier wave generated by the network connectivity devices 610 may propagate in or on the surface of electrical conductors, in coaxial cables, in waveguides, in optical media, for example optical fiber, or in the air or free space. The information contained in the baseband signal or signal embedded in the carrier wave may be ordered according to different sequences, as may be desirable for either processing or generating the information or transmitting or receiving the information. The baseband signal or signal embedded in the carrier wave, or other types of signals currently used or hereafter developed, referred to herein as the transmission medium, may be generated according to several methods well known to one skilled in the art.

The processor 612 executes instructions, codes, computer programs, scripts that it accesses from hard disk, floppy disk, optical disk (these various disk based systems may all be considered secondary storage 602), ROM 604, RAM 606, or the network connectivity devices 610.

While shown as a series of steps, various steps in FIGS. 4 and 5 could overlap, occur in parallel, occur in a different order, or occur multiple times. Further, note that these steps could occur at any suitable time, such as in response to a command from a user or external device or system.

In some embodiments, various functions described above are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory.

It may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. The term "controller" means any device, system, or part thereof that controls at least one operation. A controller may be implemented in hardware, firmware, software, or some combination of at least two of the same. The functionality associated with any particular controller may be centralized or distributed, whether locally or remotely.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A system comprising:
a computing cloud comprising (i) at least one data storage unit comprising at least one memory device configured to store instructions and (ii) at least one computer processing unit configure to execute the instructions, wherein the computing cloud is configured to:
receive process-related data collected by a local environment, the process-related data associated with at least one process and collected by an industrial tool in an industrial plant;
archive the process-related data;
analyze the process-related data collected by the local environment to determine the data needed for an immediate operation of the local environment; and
instruct a client device associated with the local environment to store a subset of the data based on the analysis of the process-related data from the local environment.

2. The system of claim 1, wherein the industrial tool comprises a sensor configured to collect data associated with industrial equipment.

3. The system of claim 2, wherein the sensor is configured to capture sensor readings at a specified interval, the local environment is configured to use a subset of the sensor readings, and the client device is configured to provide all of the sensor readings to the computing cloud.

4. The system of claim 1, wherein the computing cloud is configured to provide trend displays, alarms, event summaries, and event archives based on the process-related data to the client device.

5. The system of claim 1, wherein the computing cloud is configured to allow the client device to connect to the computing cloud through a Service Oriented Architecture.

6. The system of claim 5, wherein the computing cloud is configured to aggregate data from a plurality of client devices.

7. The system of claim 1, wherein:
the computing cloud is configured to support a partition model with at least a first part of the data stored in the client and a second part of the data stored in the computing cloud; and
the computing cloud is configured to determine whether each of the first part and the second part is stored in the client or the computing cloud according to a location of the data, the location comprising one of the computing cloud and the client.

8. A method comprising:
obtaining, using a computing cloud comprising at least one memory device storing instructions executed by at least one computer processing unit, data associated with at least one process tool from a client, wherein the at least one process tool comprises at least one sensor in an industrial plant and used to collect the data;
storing the data related to the at least one process tool in the computing cloud;
analyzing the data related to the at least one process tool to determine the data needed for an immediate operation of the process tool;
instructing the client, based on the analysis, to cache a subset of the data;
caching, by the client, the subset of the data that is obtained by the process tool according to the instructing; and
providing access to the data associated with the at least one process tool in the computing cloud through a secure connection.

9. The method of claim 8, wherein the computing cloud receives data from a plurality of clients and uses the data from the clients in performance benchmarking.

10. The method of claim 8, wherein the computing cloud instructs the client to cache the data by caching a subset of sensor readings produced by the at least one sensor and to provide all of the sensor readings to the computing cloud.

11. The method of claim 8, further comprising:
aggregating, with a local collector, data from a plurality of clients in diverse geographic areas, the aggregated data collected by the computing cloud, wherein the obtained data from the at least one process tool from the client is part of the aggregated data.

12. The method of claim 8, wherein the secure connection is a file transfer protocol secure connection.

13. The method of claim 8, wherein the data comprises data associated with at least one of temperature and vibration of the at least one process tool.

14. An apparatus comprising:
at least one data storage unit comprising at least one memory device configured to store (i) data associated with at least one industrial tool within an industrial plant in a computing cloud and (ii) instructions; and
at least one computer processing unit configured to execute the instructions in order to:
control connections between the computing cloud and at least one client;

record data from the at least one client;
analyze the data from the at least one client to determine the data needed for an immediate operation of the at least one client; and
instruct the at least one client, based on the analysis, to cache a subset of the data;
wherein the at least one client is configured to cache the subset of the data that is obtained by the industrial tool according to the instructing.

15. The apparatus of claim 14, wherein the at least one computer processing unit is configured to instruct the at least one client on the data to be cached by instructing the at least one client to cache the subset of data captured by the at least one client.

16. The apparatus of claim 15, wherein the at least one memory device is configured to store all of the data captured by the at least one client.

17. The apparatus of claim 14, where the apparatus is configured to connect to the at least one client through a secure connection.

18. The apparatus of claim 17, wherein the secure connection is a file transfer protocol secure connection.

19. The apparatus of claim 14, wherein the data associated with the at least one industrial tool comprises at least one of temperature and vibration data associated with the at least one process tool.

20. The apparatus of claim 14, wherein the apparatus is configured to allow the at least one client to connect to the computing cloud through a Service Oriented Architecture.

21. The system of claim 2, wherein the sensor is configured to measure one or more operational conditions of an automated factory.

* * * * *